April 17, 1928.  
G. M. WADDY  
1,666,585  
SAFETY BRAKE BEAM SUPPORT  
Filed Feb. 25, 1927

Inventor  
G. M. Waddy  
By C. A. Snow & Co.  
Attorneys.

Patented Apr. 17, 1928.

1,666,585

UNITED STATES PATENT OFFICE.

GEORGE M. WADDY, OF BUFFALO, NEW YORK.

SAFETY BRAKE-BEAM SUPPORT.

Application filed February 25, 1927. Serial No. 170,902.

The present invention relates to a safety device especially designed for use on railway car trucks, and aims to provide novel means whereby the brake beams will be caught and supported, should they become disconnected from their trucks, thereby eliminating any possibility of the brake beams falling to the tracks to derail the car.

An important object of the invention is to provide a device of this character which may be readily and easily positioned on the usual transverse beams of a car truck, eliminating the necessity of jacking up the car frame in order to position the device.

A still further object of the invention is to provide means whereby the nuts of the bolts employed as a securing means, will be locked against accidental displacement, due to vibrations of the brake beams.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
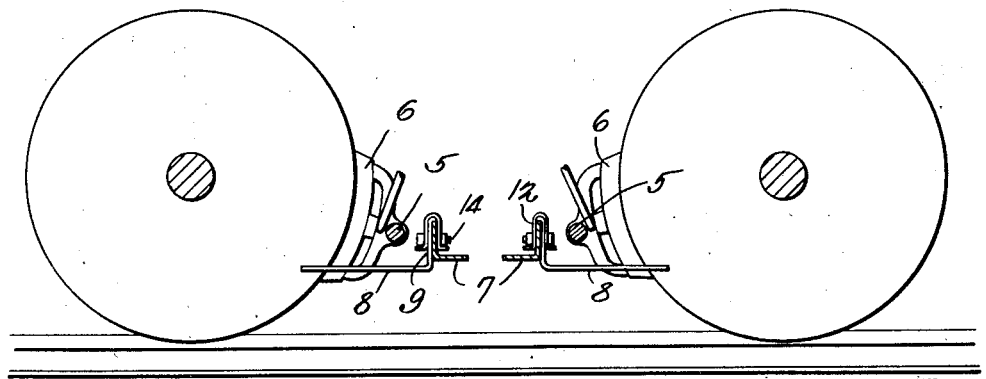
Figure 1 is a sectional view through a car truck showing safety brackets constructed in accordance with the invention.
Figure 2:
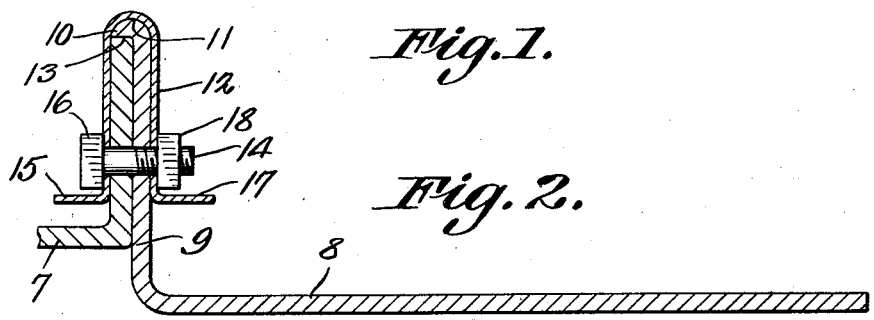
Figure 2 is a longitudinal sectional view through a bracket.
Figures 3, 4:
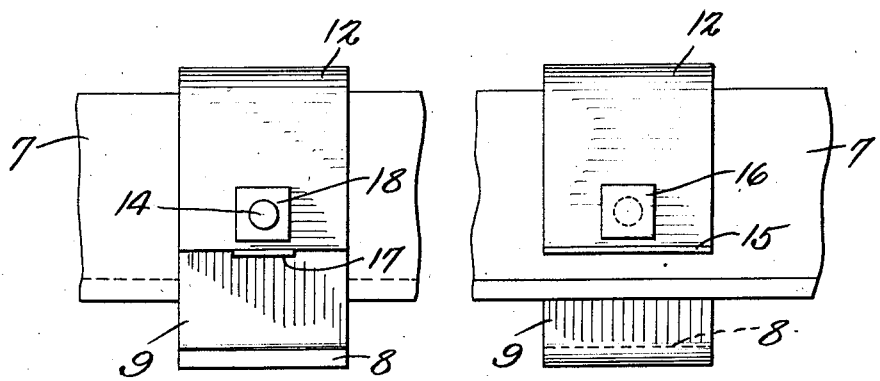
Figure 3 is a front elevational view thereof.
Figure 4 is a rear elevational view thereof.

Referring to the drawing in detail, the reference character 5 designates brake beams of a railway car truck construction, and which support brake shoes 6 that contact with the wheels, in the usual and well known manner.

The reference character 7 designates transverse bars of a car truck, which are formed of angle bar material.

It is contemplated to use one of these brackets or supporting arms at each end of the brake beam associated therewith, and as shown, each of these brackets includes a horizontal section 8, and a vertical end member 9 formed with a flange 10 at its upper end, and extended laterally therefrom.

These brackets are formed of lengths of sheet metal sufficiently heavy to support the brake beams associated therewith, should the brake beams become disconnected from the trucks.

The upper edge of the flange 10 is curved as at 11 so that the securing member 12, which is formed of comparatively light sheet metal material may be bent therearound or constructed in such a way that it will closely engage the upper end of the flange.

A shoulder 13 is provided by the flange and rests on the upper edge of the angle bar to which the bracket is secured, the bracket, angle bar and member 12 being provided with aligning openings to receive securing bolts 14 associated therewith.

One end of the member 12 is extended laterally as at 15 providing a lock for the bolt head 16, the opposite end of the member 12 being extended laterally as at 17 after the nut 18 has been positioned, thereby locking the nut against movement after it has been positioned to secure the safety bracket to the beam.

From the foregoing it will be seen that due to this construction, a safety bracket such as illustrated, may be readily and easily positioned without the necessity of jacking up the car body and the member 12 may be easily positioned to grip the bracket and angle bar.

Should the brake beams become disconnected and fall, they will be caught by these brackets and held elevated above the track eliminating any possibility of the brake beam falling to the track to derail the car.

I claim:

A safety bracket to be attached to a transverse bar of a truck frame, including a length of sheet metal having an upstanding end portion, a laterally disposed flange formed along the upper edge of the upstanding end portion and adapted to rest on the upper edge of the transverse bar, said transverse bar and upstanding end portion having registering openings, a securing member of a width equal to the width of the length of sheet metal, said securing member being U-shaped in formation to fit over the transverse bar and upstanding end portion, said securing member having openings registering with the first mentioned openings, and a bolt extending through the registering openings for securing the safety bracket to the transverse bar.

In testimony that I claim the foregoing as my own, I have hereto affixed my signature.

GEORGE M. WADDY.